(12) United States Patent
Bendell et al.

(10) Patent No.: US 7,156,166 B2
(45) Date of Patent: Jan. 2, 2007

(54) HEATING AND AIR-CONDITIONING SYSTEM FOR A MOTOR VEHICLE

(75) Inventors: Ian Bendell, Mönsheim (DE); Wolfgang Dieksander, Filderstadt (DE); Gebhard Schweizer, Leonberg (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/919,591

(22) Filed: Aug. 1, 2001

(65) Prior Publication Data

US 2002/0014331 A1 Feb. 7, 2002

(30) Foreign Application Priority Data

Aug. 1, 2000 (DE) .................... 100 37 384

(51) Int. Cl.
*B60H 1/00* (2006.01)
*F28F 7/00* (2006.01)

(52) U.S. Cl. .............. 165/203; 165/42; 165/72; 165/76; 62/244

(58) Field of Classification Search .......... 165/202, 165/203, 253, 41, 42, 43, 204, 72, 76; 454/75, 454/76; 62/244
See application file for complete search history.

(56) References Cited

U.S. PATENT DOCUMENTS

| | | | | |
|---|---|---|---|---|
| 3,918,270 A * | 11/1975 | Dixon et al. ............... 62/244 |
| 5,042,566 A | 8/1991 | Hildebrand ............... 165/42 |
| 5,101,883 A * | 4/1992 | Kinmartin et al. .......... 165/43 |
| 5,478,274 A * | 12/1995 | Danieau ................ 165/43 X |
| 5,529,116 A * | 6/1996 | Sasaki et al. ............. 165/144 |
| 5,711,368 A * | 1/1998 | Ito et al. ................... 165/53 |
| 5,737,936 A * | 4/1998 | Takasaki ................ 62/259.1 |
| 5,803,160 A | 9/1998 | Danieau .................. 165/42 |
| 5,862,677 A | 1/1999 | Kim et al. ................ 62/244 |
| 5,884,697 A * | 3/1999 | Pierron et al. ............. 165/203 |
| 5,954,578 A * | 9/1999 | Takasaki ............... 165/76 X |
| 6,019,162 A * | 2/2000 | Saida et al. ................ 165/42 |
| 6,019,163 A * | 2/2000 | Saida et al. ........... 165/203 X |
| 6,029,739 A * | 2/2000 | Izawa et al. ............... 165/42 |
| 6,129,140 A * | 10/2000 | Kawahara ................ 165/42 |
| 6,131,652 A * | 10/2000 | Ito et al. ............... 165/42 X |
| 6,179,044 B1 * | 1/2001 | Tabara ..................... 165/42 |
| 6,265,692 B1 * | 7/2001 | Umebayahi et al. ...... 165/41 X |
| 6,311,763 B1 * | 11/2001 | Uemura et al. ............. 165/43 |
| 6,422,301 B1 * | 7/2002 | Scoccia et al. ............. 165/42 |
| 6,450,246 B1 * | 9/2002 | Kurokawa et al. .......... 165/42 |
| 6,453,991 B1 * | 9/2002 | Tsurushima et al. ....... 165/202 |
| 6,601,639 B1 * | 8/2003 | Shibata .................... 165/42 |
| 6,609,563 B1 * | 8/2003 | Tsurushima et al. ..... 165/76 X |
| 6,871,695 B1 * | 3/2005 | Sato et al. ................. 165/42 |
| 2001/0045268 A1 * | 11/2001 | Sato et al. ................ 165/76 |

FOREIGN PATENT DOCUMENTS

| | | |
|---|---|---|
| DE | 197 31 908 A1 | 1/1999 |
| EP | 0 397 997 B1 | 12/1992 |
| EP | 0 756 955 A2 | 2/1997 |

(Continued)

*Primary Examiner*—Ljiljana Ciric
(74) *Attorney, Agent, or Firm*—Foley & Lardner LLP (57) ABSTRACT

A heating and air-conditioning system for a motor vehicle has a conditioning housing that includes a connecting section which is provided with at least one air outlet opening. Using connecting structure on the connecting section, the air outlet opening may be connected to either an attachable rear vehicle compartment temperature-control unit or closed tightly, in a leak-proof manner, by a removable covering part.

20 Claims, 5 Drawing Sheets

FOREIGN PATENT DOCUMENTS

| | | |
|---|---|---|
| EP | 0 893 292 A2 | 1/1999 |
| EP | 0 936 090 A2 | 8/1999 |
| FR | 2 778 152 | 11/1999 |
| GB | 686 063 | 1/1953 |

* cited by examiner

HEATING AND AIR-CONDITIONING SYSTEM FOR A MOTOR VEHICLE

BACKGROUND OF THE INVENTION

1. Field of the Invention

The invention relates to a heating and air-conditioning system for a motor vehicle, having a conditioning housing in which at least one heat exchanger is integrated and which has a plurality of air outlet openings for guiding air to front interior zones of the motor vehicle.

2. Description of Related Art

Heating and air-conditioning systems, in general, are known. In one known heating and air-conditioning system having a simple design, temperature control is possible only in the front interior zones, and no additional temperature control at the rear is provided. Heating and air-conditioning systems of this type are used, particularly in relatively small passenger vehicles.

Heating and air-conditioning systems of a more complicated design are also known (DE 197 31 908 A1 or FR 27 78 152 A1 or U.S. Pat. No. 5,862,677 A). In these heating and air-condition systems, temperature control of the rear interior zones is provided in addition to temperature control of the front interior zones. The heating and air-conditioning systems illustrated in the above-mentioned publications have relatively large conditioning housings in which all of the temperature-control and the control and air-guiding functions both for the front interior zones and for the rear interior zones are integrated. By means of these more complicated heating and air-conditioning systems, individual temperature control of the rear region or of the front region of the particular motor vehicle is possible. Such heating and air-conditioning systems are particularly suitable for relatively large, well-equipped passenger vehicles.

Therefore, depending on the desired design of a given motor vehicle, different conditioning housings must be produced and fitted accordingly.

SUMMARY OF THE INVENTION

An object of the invention is to provide a heating and air-conditioning system of the type discussed above with simple means that can be used as a system for controlling the temperature only at the front or as a system controlling the temperature at the front and rear, depending on the requirement of a given application.

In accomplishing the objects of the invention, there has been provided according to one aspect of the invention a heating and air-conditioning system for a motor vehicle, comprising a conditioning housing; a first heat exchanger operably integrated within said conditioning housing; a plurality of air outlet openings in said conditioning housing for guiding air to front interior zones of a motor vehicle; a connecting section on the outside of said conditioning housing; an air outlet opening through said connecting section; and means for selectively attaching to said connecting section either a releasable cover for covering, in a tight, leak-proof manner, said air outlet opening through said connecting section; or a rear temperature control unit attached in a tight/leak-proof manner to said connecting section and in fluid communication with said conditioning housing via said air outlet opening through said connecting section.

According to another aspect of the invention, there is provided a motor vehicle comprising a heating and air-conditioning system comprising a conditioning housing; a first heat exchanger operably integrated within said conditioning housing; a plurality of air outlet openings in said conditioning housing for guiding air to front interior zones of a motor vehicle; a connecting section on the outside of said conditioning housing; an air outlet opening through said connecting section; and means for selectively attaching to said connecting section either a releasable cover for covering, in a tight, leak-proof manner, said air outlet opening through said connecting section; or a rear temperature control unit attached in a tight/leak-proof manner to said connecting section and in fluid communication with said conditioning housing via said air outlet opening through said connecting section.

In accordance with an additional aspect of the invention, there is provided a conditioning housing for a heating and air-conditioning system that can be adapted to produce either a two-zone, three-zone or four zone system, comprising a heat exchanger operably integrated within said conditioning housing; a connecting section on the outside of said conditioning housing; an air outlet opening through said connecting section; and means for selectively attaching to said connecting section either (i) a releasable cover for covering, in a tight, leak-proof manner, said air outlet opening through said connecting section; or (ii) a rear temperature control unit attached in a tight/leak-proof manner to said connecting section and in fluid communication with said conditioning housing via said air outlet opening through said connecting section.

Further objects, features and advantages of the present invention will become apparent from the detailed description of preferred embodiments that follows when considered together with the accompanying drawings.

BRIEF DESCRIPTION OF THE DRAWINGS

The invention is explained in detail below with reference to the exemplary embodiments and with reference to the accompanying drawings, in which.

DETAILED DESCRIPTION OF THE PREFERRED EMBODIMENTS

The invention provides for a conditioning housing having on the outside a connecting section which is provided with at least one air outlet opening. The connecting section is intended to connect the conditioning housing to an optionally attachable rear temperature-control unit. When not in use, the connecting section can be closed tightly, in a leak-proof manner, by a releasable cover. According to the invention, therefore, the conditioning housing forms a basic module to which an additional module such as a corresponding rear temperature-control unit can be attached in a simple manner. If, in addition, rear temperature control is also desired, then, according to the invention, an additional unit has merely to be attached to the existing conditioning housing, and it is not necessary to produce a new housing. Therefore, the solution according to the invention is suitable for both simple designs where only front temperature control is desired and more complicated designs where a rear temperature control, which can be set individually, is additionally desired. A front-zone heating and air-conditioning system can therefore be converted into a front- and rear-zone heating and air-conditioning system with a substantially reduced outlay on development and production. As a result, it is also possible to retrofit a heating and air-conditioning system of this type, having a simple design, at a later time. The heating and air-conditioning system may, depending on the design, also be provided with a left/right separation both for the front temperature control and for the rear temperature control. In this case, independent temperature control is possible for the driver's side and the front-passenger's side. According to the invention, the term temperature control is intended to encompass heating, cooling and simple ventilation.

In a refinement of the invention, an air guiding arrangement leading to the rear is provided as the rear temperature-control unit. As a result, the rear zone can be ventilated. If a left/right separation of the temperature control is provided at the front, then, together with the rear zone, a total of three zones are produced which can be individually temperature-controlled.

According to a further aspect of the invention, the rear temperature-control unit has an additional housing in which at least one air control element and/or a heat exchanger is/are integrated. The additional housing preferably forms a further air distributing space which, in conjunction with the additional heat exchanger, makes possible individual temperature control of the rear region. If the heat exchanger is provided with a left/right separation, a total of four individually settable temperature-control zones in the front and rear region are produced.

In another preferred embodiment of the invention, the connecting section is substantially larger than the air outlet opening, and the additional housing has an open housing section which can be attached tightly, in a leak-proof manner, to the connecting section of the conditioning housing. Therefore, the connecting section provided in the region of the housing wall of the conditioning housing takes on an additional function as a housing wall for the additional housing. This results in savings on construction space.

In a further preferred aspect of the invention, the connecting section and the rear temperature-control unit are provided with flange members which correspond to one another and can be fitted together, to provide connecting structure. As a result, the rear temperature control unit can be securely positioned and centered. Tight, leak-proof attachment of the rear temperature-control unit to the conditioning housing is therefore ensured with interposition of suitable sealing means. The securing of the tight, leak-proof fit of the rear temperature-control unit to the connecting section is ensured by fastening means engaging in a bonding, frictional or interlocking manner.

In yet another refinement of the invention, the heat exchangers are provided with water or air regulating means. In the case of the water regulating means, there are preferably integrated in the heating unit a plurality of PTC (positive temperature coefficient) elements which can be activated electrically via an electronic regulator. In the case of the air regulating means, the quantity of air flowing through the corresponding heating unit is controlled at the input and/or output of the heating unit by air flaps.

Turning now to the drawings, the heating and air-conditioning systems described below are provided for use in passenger vehicles and are of modular construction enabling different temperature-control variants to be produced. As discussed in the description of related art above, the basic structure and the arrangement of heating and air-conditioning systems in motor vehicles in general, are known, so a more detailed explanation is not provided here.

Figure 1:
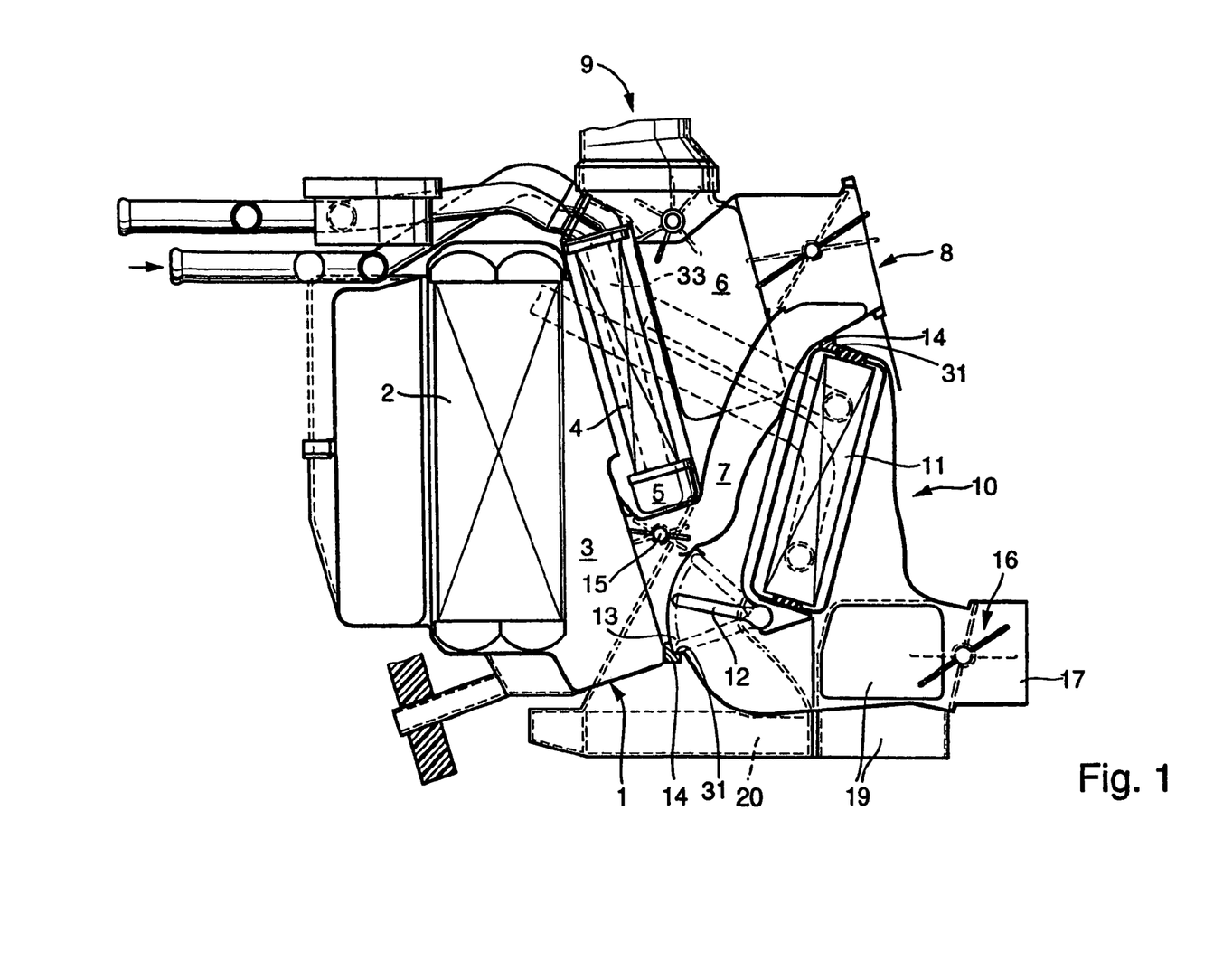
FIG. 1 depicts, in a sectional illustration, a first embodiment comprising a heating and air-conditioning system according to the invention that provides for both front and rear temperature control.

The heating and air-conditioning system according to FIG. 1 has a conditioning housing 1 in which an evaporator 2 is arranged. The evaporator 2 is supplied with air via a fan, which is typically included but has not been depicted or described in greater detail here for the sake of clarity. The air then passes into a first air distributing space 3. A heating unit 4 which is provided with a water regulating means is arranged in an upper part of the housing 1. For this purpose, a regulator 5 is integrated into a water box of the heating unit 4 and is used for the electrical control of PTC heating elements 33, which are typically included and have been illustrated schematically in the drawing, within the heating unit 4.

Figure 7:
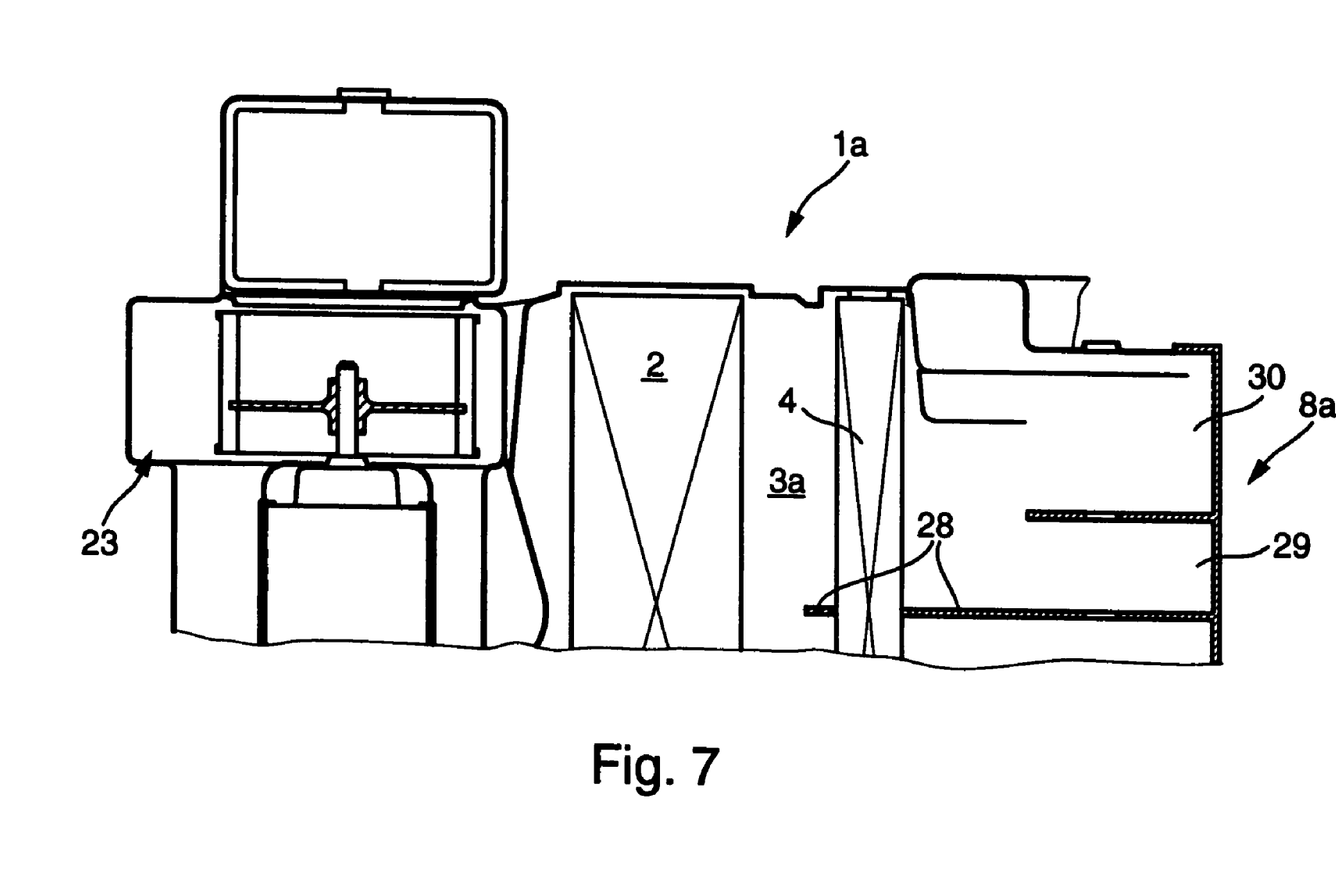
FIG. 7 shows a partial section along the sectional line VII—VII of the heating and air-conditioning system according to FIG. 4.

The heating unit 4 and the conditioning housing 1 are provided with a left/right separation by, as shown for example in FIG. 7, a partition 28 in the conditioning housing 1. The partition makes independent temperature control on the driver's side and front-passenger's side possible.

Provided in the conditioning housing 1 on the output side of the heating unit 4 is a further air distributing space 6 which conducts the air, which, if appropriate, has been temperature-controlled by the heating unit 4, to various air outlet nozzles 8, 9, 20 of the front zone of a vehicle interior of a passenger vehicle. For this purpose, corresponding air flaps are typically provided but are not described in greater detail for the sake of clarity. The air outlet nozzles 8 lead to the side and central vents in the region of the dashboard. The air outlet nozzle 9 leads to defrosting openings below the windshield. The air outlet nozzles 20 are used for the front temperature control of the footwell. Provided parallel to the air distributing space 6 is a cold air duct or bypass 7 which can conduct cold air to the air outlet nozzles 8. The latter can be controlled by an air flap 15.

Figure 2:
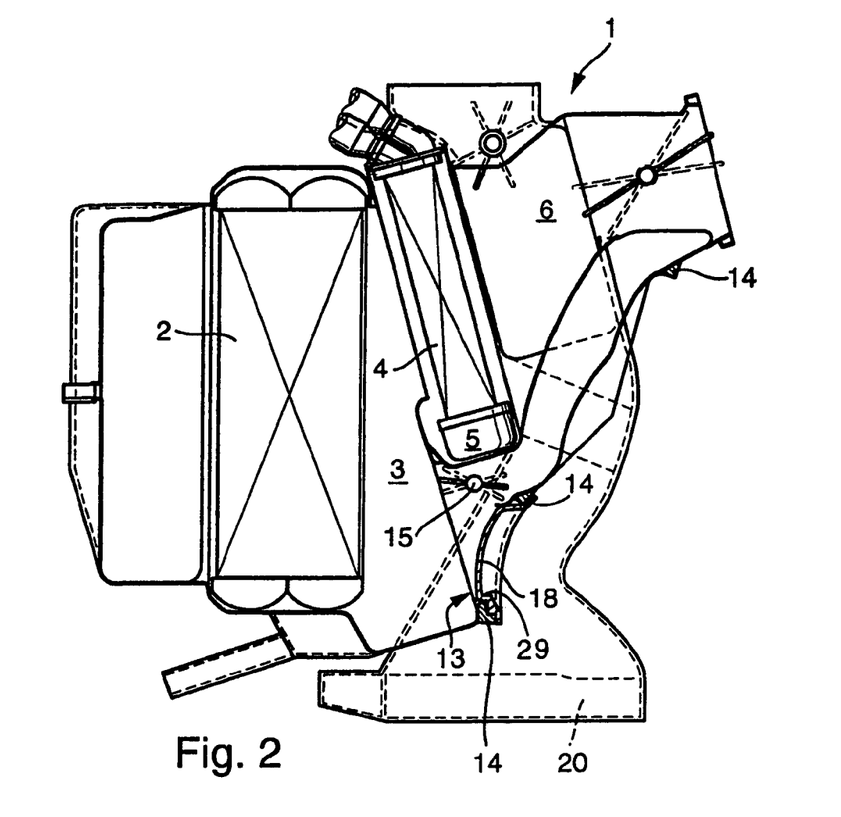
FIG. 2 shows a heating and air-conditioning system similar to FIG. 1, which is provided merely for front temperature control.
Figure 3:
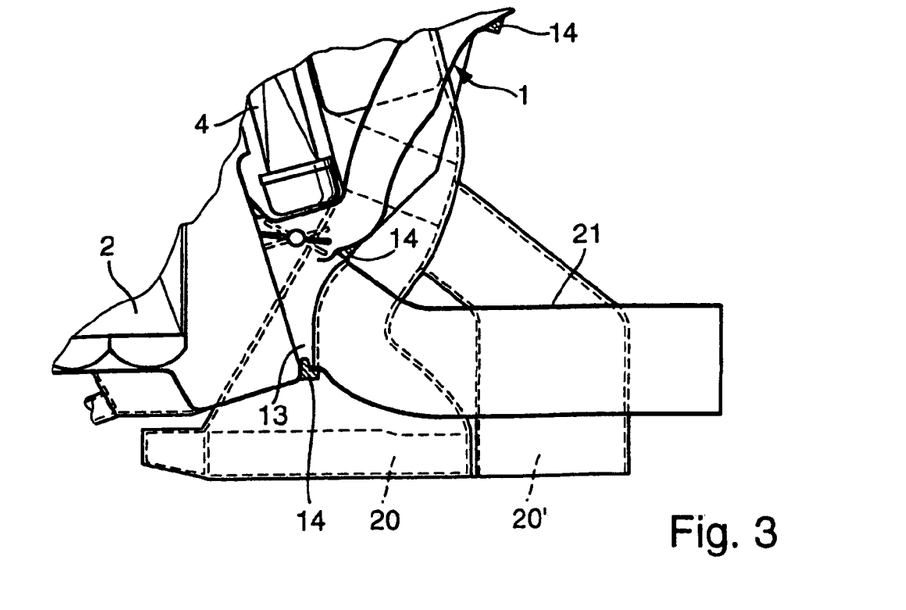
FIG. 3 shows a further embodiment of a heating and air-conditioning system according to the invention similar to FIGS. 1 and 2 with rear ventilation.

Directly below the air flap 15, an air outlet opening 13 is provided in the conditioning housing 1. The opening is part of a rear connecting section of the conditioning housing 1—as seen in the normal direction of travel of the passenger vehicle. The air outlet opening 13 is surrounded by flange members in the form of profiles 14 which are used for centering or positioning various rear temperature-control units (FIGS. 1 to 3). The upper end of the connecting section of the conditioning housing 1 is provided by the flange members or profiles 14 on the rear outer wall of the conditioning housing 1, approximately level with the outlet end of the air guiding duct 7 in the conditioning housing 1. An additional housing 10 which is open toward the conditioning housing 1 is attached to the entire connecting section. Thus, when the additional housing 10 of the rear temperature-control unit is attached, the rear outer wall of the conditioning housing 1 also forms the corresponding wall for the additional housing 10.

In a further preferred aspect of the invention, the connecting section and the rear temperature-control unit are provided with flange members which correspond to one another and can be fitted together, to provide connecting structure. Further, in the region of the flange members 14 which are used for centering and positioning the additional housing 10 on the conditioning housing 1, sealing means are provided which ensure the tight, leak-proof connection of the additional housing 10 to the conditioning housing 1 and the air outlet opening 13. The connecting structure includes fastening means 31 that are typically provided for securing the additional housing 10 to the conditioning housing 1 and for securing the tight, leak-proof connection. The connecting structure preferably engages in a bonding, frictional or interlocking manner.

The additional housing 10 forms an air distributing box in which a further heating unit 11 as illustrated, for example, in FIG. 1 is integrated. The heating unit 11 is likewise provided with a left/right separation, but rather than being regulated on the water side, the heating unit 11 is regulated on the air side. For this purpose, a distributor flap 12 which can be activated by corresponding control or regulating means is provided in the additional housing 10. The additional housing 10 has a plurality of air outlet nozzles 17, 19 which provide rear ventilation (air outlet nozzles 17) and footwell ventilation in the rear and side-window defrosting (air outlet nozzle 19). For this purpose, a further air flap 16 which distributes air between the footwell, defrosting and ventilation nozzles is provided on the output side of the additional housing 10. The ventilation nozzles, i.e., the air outlet nozzles 17, are connected via corresponding air guiding ducts to rear vents which are directed toward the seat positions of the rear passengers. The heating unit 11 is also provided with a left/right separation, such that the heating and air-conditioning system according to FIG. 1 is a four-zone temperature-control means. Thus, in addition to the front region on the driver's side and front-passenger's side, the rear region lying behind the driver's region and the rear region lying behind the front-passenger's region can each be temperature-controlled separately.

In FIG. 2, a two-zone variant of the conditioning housing 1 depicted in FIG. 1 is provided. In the two-zone variant, the conditioning housing 1 as well as all of the functioning parts present in the conditioning housing 1 correspond to the design according to FIG. 1. Accordingly, parts and units which are identical in construction and function are provided with the same reference numbers as used in the exemplary embodiment depicted in FIG. 1. Only front temperature control is possible with the heating and air-conditioning system according to FIG. 2. This is because the air outlet opening 13 arranged below the heating unit 4 and below the air flap 15 is closed here in a tight/leak-proof manner with a cover 18. The cover 18 is provided with plug-in or latching members 29 which are matched to the flange profile members 14 of the conditioning housing 1, so that a tight, leak-proof fit of the cover 18 in the air outlet opening 13 is ensured. The cover 18 is preferably provided with additional sealing means, e.g., resilient seals, which are not described in greater detail here for the sake of clarity. Alternate designs for the members covering for the solution according to the invention can be formed by cylindrical bodies, such as stoppers or the like. It can be seen from FIGS. 1 and 2 that the flange members 14 positioned below the air outlet opening 13 form part of the connecting structure for both the additional housing 10 as well as the cover member 18, i.e., the alternative additional members that are selectively chosen to cover the air outlet opening 13 depending on whether a two-zone air-conditioning system is desired or a system for serving more than two zones (front and rear sections of the vehicle compartment).

In the exemplary embodiment according to FIG. 3, a three-zone variant derived from the heating and air-conditioning system according to FIG. 1 and from the heating and air-conditioning system according to FIG. 2 is illustrated. In this embodiment, an air guiding arrangement 21 which makes rear ventilation possible and serves as the rear temperature-control unit is attached in the region of the air outlet opening 13. Separate and individual temperature control of the left and right side of the rear compartment is, however, not possible in this embodiment. Rather, only cold air which has been cooled by the evaporator 2 can be branched off from the conditioning housing 1 via the air guiding arrangement 21.

The footwell of the rear is temperature-controlled by air guiding ducts 20' which originate from the conditioning housing 1 by branching from front footwell ducts 20 as depicted in FIG. 3.

All three heating and air-conditioning systems according to FIGS. 1 to 3 have the same conditioning housing 1. In order to obtain different temperature-control functions, modifications are merely made by closing the air outlet opening 13 or connecting the air outlet opening 13 to an air guiding arrangement 21 (FIG. 3) or an additional housing 10 (FIG. 1).

Figure 4:
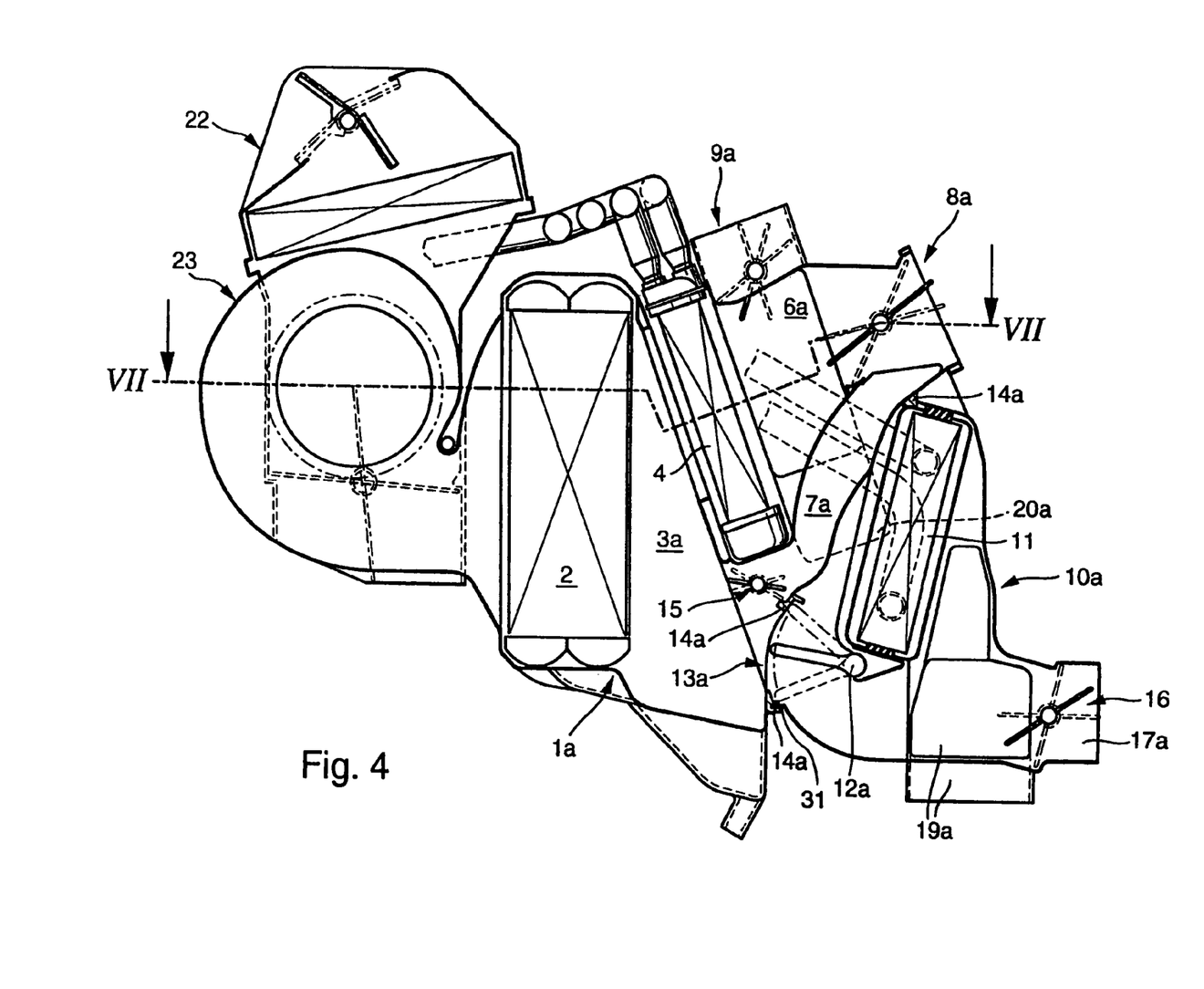
FIG. 4 shows a further embodiment of a heating and air-conditioning system according to the invention with a combined front and rear temperature control.

In the heating and air-conditioning system according to FIG. 4, parts which are identical in function and structure to the exemplary embodiments according to FIGS. 1 to 3 are provided with the same reference numbers. Parts which are only identical in function, but deviate in manner of construction, are referred to by the same reference numbers, but with the addition of the letter a. In FIG. 4, the fan or blower 23 which is positioned on the input side of the evaporator 2 and a fresh air inlet 22 which is connected upstream of the fan 23 are also illustrated. These components are basically known and, therefore, do not have to be discussed in greater detail here. In addition, those parts of the conditioning housing 1*a* which are identical in function and/or construction are not described further for the sake of clarity. Reference is made in this respect to the description of the exemplary embodiments according to FIGS. 1 to 3.

In a manner similar to that depicted in FIG. 1, an additional housing 10*a* (which is part of a rear temperature-control unit similar to the one shown in FIG. 1) is attached to the conditioning housing 1*a* and is depicted in FIG. 4. In addition, for the rear temperature-control unit, parts which are identical to the exemplary embodiment according to FIG. 1 are provided with the same reference numbers, and parts which are identical in function, but not in construction, are provided with the same reference numbers with the addition of the letter a.

FIG. 7, in a plan view, illustrates a cut-open part of the heating and air-conditioning system according to FIG. 4. From this illustration, the left/right separation in the region of the conditioning housing 1*a* can be seen as the partition 28 which extends vertically and in the longitudinal direction of the vehicle being illustrated. In addition, it can be seen that the air outlet regions 8*a* are divided into central nozzles 29 and side nozzles 30.

The function of the rear temperature-control unit, which comprises the additional housing 10*a*, the air outlet regions 17*a* and 19*a*, the distributor flap 12*a* and the air flap 16, corresponds to the exemplary embodiment according to FIG. 1. For further explanation, reference can be made to the exemplary embodiment according to FIG. 1. The air guiding ducts 20a leading to the front footwell vents are indicated merely by dashed lines. Thus, the heating and air-conditioning system according to FIG. 4 constitutes a four-zone variant similar to the heating and air-conditioning system according to FIG. 1.

Figure 5:
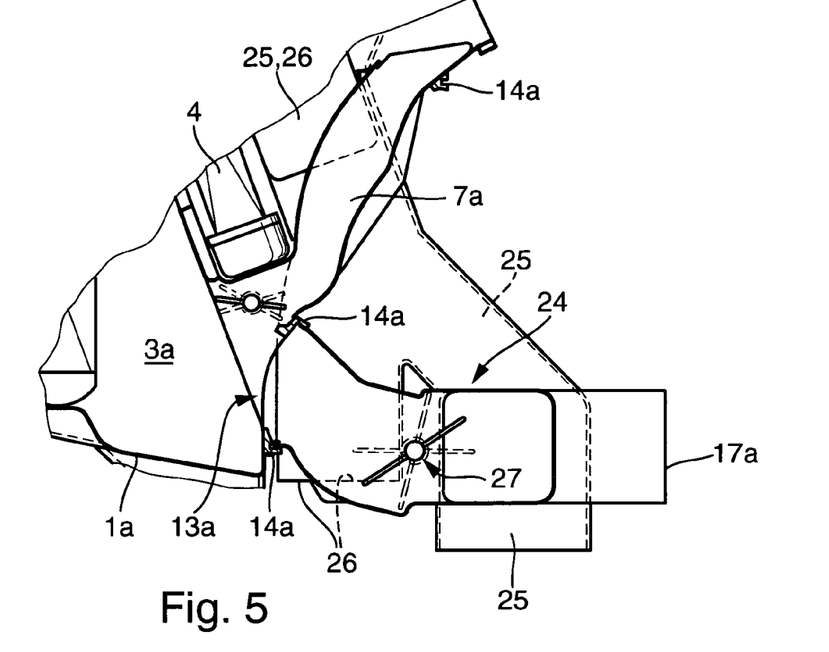
FIG. 5 shows a detail of a heating and air-conditioning system similar to FIG. 4 with a rear temperature control.
Figure 6:
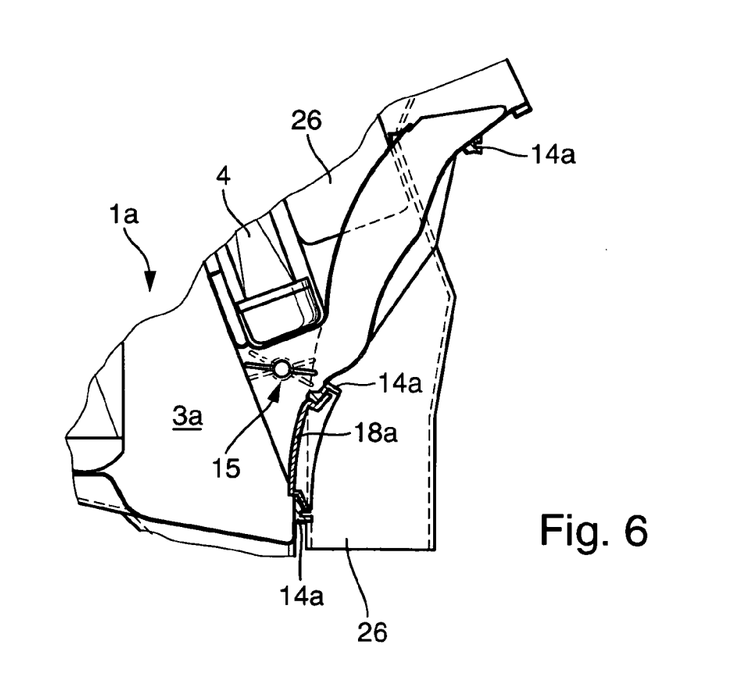
FIG. 6 shows a further embodiment of a heating and air-conditioning system similar to FIG. 4 with only front temperature control.

The heating and air-conditioning systems according to FIGS. 5 and 6 proceed from a conditioning housing 1a according to FIG. 4, with an air guiding arrangement 24 being provided in the region of the air outlet opening 13a in the design according to FIG. 5. This air guiding arrangement has a housing in which an air flap 27 is integrated. The air guiding arrangement 24 leads to rear vents which control the temperature of the seat positions in the rear region. The air flap 27 is used for admixing cold air to the footwell ducts 25 in the rear region. The footwell ducts 25 branch off from the conditioning housing 1a together with the front footwell ducts 26. Temperature control is also possible in a similar manner for the rear ventilation nozzles 17a, since the heated air which is supplied via the rear footwell ducts 25 may also be used for temperature control of the air supplied to the rear ventilation nozzles 17a depending on the position of the air flap 27. A left and right separation and also, accordingly, independent temperature control of the rear region on the left and right sides is, however, not possible. Thus, the exemplary embodiment according to FIG. 5 is a three-zone variant.

In the exemplary embodiment according to FIG. 6, a two-zone variant similar to the exemplary embodiment according to FIG. 2 is illustrated. Here as before, parts which are identical in function and construction have the same reference numbers, and parts which are identical in function, but not in construction, have the same reference numbers with the addition of the letter a. The air guiding ducts 26 which branch off from the air distributing space 6a behind the heating unit 4 of the conditioning housing 1a are used for temperature control of the footwell in the front region of the vehicle interior.

The exemplary embodiments according to FIGS. 4 and 6 also proceed in each case from the same basic module, namely, the conditioning housing 1a to which different rear temperature-control units can be connected or whose air outlet opening 13a can be closed by a cover 18a. Depending on the intended use, a two-zone variant, a three-zone variant and a four-zone variant can therefore be realized in a simple manner with the conditioning housing 1a itself not having to be changed.

The right of priority is claimed based on disclosure of German Patent Application No. 100 37 384.4, filed Aug. 1, 2000, which is hereby incorporated by reference in its entirety.

The foregoing embodiments have been shown for illustrative purposes only and are not intended to limit the scope of the invention which is defined by the claims.

What is claimed is:

1. A heating and air-conditioning system for a motor vehicle having front and rear internal vehicle compartments, comprising:
   (a) a conditioning housing;
   (b) a first heat exchanger and a second heat exchanger operably integrated within said conditioning housing;
   (c) a plurality of air outlet openings in said conditioning housing for guiding air to front interior zones in the front internal vehicle compartment;
   (d) a connecting section on the outside of said conditioning housing;
   (e) an air outlet opening through said connecting section, said air outlet opening being in parallel air flow relationship with air flow through said first heat exchanger;
   (f) an additional member selectively mounted over said air outlet opening through said connecting section, said additional member being selected (from the group consisting of
      (i) a releasable cover for covering, in a tight, leak-proof manner, said air outlet opening through said connecting section; and
      (ii) a rear vehicle compartment temperature control unit attached in a tight, leak-proof manner to said connecting section and in fluid communication with said conditioning housing via said air outlet opening through said connecting section, said rear temperature control unit comprising an additional housing and a third heat exchanger operably integrated in the additional housing; and
   (g) connecting means, associated with at least said connecting section of said conditioning housing, for selectively and alternately attaching each of said releasable cover and said rear vehicle compartment temperature control unit to said connecting section.

2. A heating and air-conditioning system as claimed in claim 1, wherein the motor vehicle further comprises rear interior zones in the rear internal vehicle compartment.

3. A heating and air-conditioning system as claimed in claim 1, wherein said rear temperature control unit comprises an air guiding arrangement leading from said conditioning housing to said rear interior zones.

4. A heating and air-conditioning system as claimed in claim 1, wherein said additional housing comprises at least one air control element.

5. A heating and air-conditioning system as claimed in claim 1, further comprising a partition separating said first heat exchanger into a left portion and a right portion.

6. A heating and air-conditioning system as claimed in claim 1, further comprising a partition separating at least one of said first and third heat exchangers into respective left and right portions.

7. A heating and air-conditioning system as claimed in claim 1, wherein said connecting means associated with said connecting section for attaching said rear temperature control unit defines an area on said connecting section that is substantially larger than said air outlet opening.

8. A heating and air-conditioning system as claimed in claim 7, wherein said additional housing comprises an open housing section capable of tight, leak-proof attachment to said connecting section of said conditioning housing.

9. A heating and air-conditioning system as claimed in claim 1, wherein said connecting means comprises flange members that are associated both with said connection section and with said rear temperature control unit and that correspond to each other and are capable of fitting together to connect said connecting section and said rear temperature control unit.

10. A beating and air-conditioning system as claimed in claim 1, further comprising a plurality of electrically activated positive temperature coefficient elements integrated in said first heat exchanger for water side temperature regulation.

11. A heating and air-conditioning system as claimed in claim 1, further comprising air flaps for regulating the flow of air through said first heat exchanger.

12. A heating and air-conditioning system as claimed in claim 1, wherein said removable cover and said rear temperature control unit include second connecting means, and said connecting means comprises profiled flange arrangements on said connecting section for selectively and alternately cooperating in a mating manner with said second connecting means on said removable cover and on said rear temperature control unit.

13. A conditioning housing according to claim 1, wherein said connecting means includes an arrangement selected from the group consisting of at least one of a banding arrangement, a frictional arrangement and an interlocking arrangement.

14. A motor vehicle comprising a heating and air-conditioning system which comprises:
   (a) a conditioning housing;
   (b) a first heat exchanger and a second heat exchanger operably integrated within said conditioning housing;
   (c) a plurality of air outlet openings in said conditioning housing for guiding air to front interior zones of a motor vehicle;
   (d) a connecting section on the outside of said conditioning housing;
   (e) an air outlet opening through said connecting section, said air outlet opening being in parallel air flow relationship with air flow through said first heat exchanger;
   (f) an additional member selectively mounted over said air outlet opening through said connecting section, said additional member being selected from the group consisting of
      (i) a releasable cover for covering, in a tight, leak-proof manner, said air outlet opening through said connecting section; and
      (ii) a rear vehicle compartment temperature control unit attached in a tight, leak-proof manner to said connecting section and in fluid communication with said conditioning housing via said air outlet opening through said connecting section, said rear temperature control unit comprising an additional housing and a third heat exchanger operably integrated in the additional housing; and
   (g) connecting means, associated with at least said connecting section of said conditioning housing, for selectively and alternately attaching each of said releasable cover and said rear vehicle compartment temperature control unit to said connecting section.

15. A conditioning housing assembly for a heating and air-conditioning system that can be adapted to produce either a two-zone, a three-zone or a four-zone system, comprising:
   (a) a first heat exchanger and a second heat exchanger operably integrated within said conditioning housing;
   (b) a connecting section on the outside of said conditioning housing;
   (c) an air outlet opening through said connecting section, said air outlet opening being in parallel air flow relationship with said first heat exchanger; and
   (d) connecting means, associated with at least said connecting section of said conditioning housing, for selectively and alternately attaching to said connecting section an additional member to be selectively mounted over said air outlet opening through said connecting section, said additional member being selected from the group consisting of
      (i) a releasable cover for covering, in a tight, leak-proof manner, said air outlet opening through said connecting section; and
      (ii) a rear vehicle compartment temperature control unit attached in a tight, leak-proof manner to said connecting section and in fluid communication with said conditioning housing via said air outlet opening through said connecting section, said rear temperature control unit comprising an additional housing and a third heat exchanger operably integrated in the additional housing.

16. A conditioning housing according to claim 15, wherein said connecting means includes an arrangement selected from the group consisting of at least one of a bonding arrangement, a frictional arrangement and an interlocking arrangement.

17. A conditioning housing according to claim 15, wherein the air outlet opening has a periphery and wherein at least a portion of the connecting means for attaching the additional member is located at the periphery of the air outlet opening.

18. A conditioning housing according to claim 15, wherein at least a portion of the connecting means for attaching the additional member is located at a position spaced apart from the periphery of the air outlet opening.

19. A conditioning housing according to claim 15, wherein the connecting means for selectively and alternately attaching the additional member comprises a first connecting means section for attaching said releasable cover (i) and a second connecting means section for attaching said rear vehicle compartment temperature control unit (ii), and wherein said second connecting means section comprises a connecting means portion that is not common to said first connecting means section.

20. A conditioning housing according to claim 15, wherein the first heat exchanger is positioned downstream of the second heat exchanger in an air flow direction.

* * * * *